US012700119B2

(12) United States Patent
Russell et al.

(10) Patent No.: US 12,700,119 B2
(45) Date of Patent: Aug. 4, 2026

(54) METHODS AND SYSTEMS FOR GENERATING A BOND LINE PARAMETER OF A CIRCUIT ASSEMBLY, AND METHODS OF MANUFACTURE OF A CIRCUIT ASSEMBLY

(71) Applicant: Arieca Inc., Pittsburgh, PA (US)

(72) Inventors: Loren Russell, Pittsburgh, PA (US);
Dylan S. Shah, Pittsburgh, PA (US);
Navid Kazem, Pittsburgh, PA (US)

(73) Assignee: ARIECA INC., Pittsburgh, PA (US)

( * ) Notice: Subject to any disclaimer, the term of this patent is extended or adjusted under 35 U.S.C. 154(b) by 239 days.

(21) Appl. No.: 18/750,220

(22) Filed: Jun. 21, 2024

(65) Prior Publication Data

US 2025/0037294 A1 Jan. 30, 2025

Related U.S. Application Data

(60) Provisional application No. 63/515,938, filed on Jul. 27, 2023.

(51) Int. Cl.
*G06T 7/60* (2017.01)
*G06T 7/00* (2017.01)
*G06T 7/70* (2017.01)

(52) U.S. Cl.
CPC .............. *G06T 7/60* (2013.01); *G06T 7/0004* (2013.01); *G06T 7/70* (2017.01); *G06T 2207/10028* (2013.01); *G06T 2207/30148* (2013.01)

(58) Field of Classification Search
CPC ........... G06T 7/60; G06T 7/0004; G06T 7/70; G06T 2207/10028; G06T 2207/30148
See application file for complete search history.

(56) References Cited

U.S. PATENT DOCUMENTS 5,113,565 A * 5/1992 Cipolla ............... H10P 72/0446
29/827
5,445,308 A 8/1995 Nelson et al.
(Continued)

FOREIGN PATENT DOCUMENTS

CN 1872942 A 12/2006
CN 1923944 B 6/2012
(Continued)

OTHER PUBLICATIONS

VytaFlex™ Series, Material Safety Data Sheet, Feb. 1, 2008, MSDS No. 618, 8 pages.
(Continued)

*Primary Examiner* — Dominic J Bologna
(74) *Attorney, Agent, or Firm* — K&L Gates LLP

(57) ABSTRACT

Methods and systems for generating a bond line parameter of a circuit assembly, and methods of manufacture of a circuit assembly are provided. The method comprises capturing, by a sensor, third three-dimensional data of the circuit assembly. The third three-dimensional data corresponds to a first region of a first component and a first region of a second component. Data corresponding to a second region of the first component and at least a portion of the first region of the second component are not present in the third three-dimensional data. The bond line parameter of the circuit assembly can be determined based on first three-dimensional data of the first component, second three-dimensional data of the second component, and the third three-dimensional data.

22 Claims, 5 Drawing Sheets

(56) References Cited

U.S. PATENT DOCUMENTS

| | | |
|---|---|---|
| 6,248,151 B1 | 6/2001 | Horine |
| 6,797,758 B2 | 9/2004 | Misra et al. |
| 7,141,273 B2 | 11/2006 | Endo et al. |
| 7,726,545 B2 | 6/2010 | Ichiryu et al. |
| 7,799,607 B2 | 9/2010 | Karashima et al. |
| 8,802,763 B2 | 8/2014 | Yamada et al. |
| 9,308,571 B2 | 4/2016 | Kempers et al. |
| 10,199,302 B1 | 2/2019 | Sanchez et al. |
| 10,777,483 B1 | 9/2020 | Kazem et al. |
| 11,021,607 B2 | 6/2021 | Bhagwagar et al. |
| 11,335,622 B2 | 5/2022 | Kazem et al. |
| 12,027,442 B1 | 7/2024 | Gelorme et al. |
| 12,107,031 B2 | 10/2024 | Akiba et al. |
| 2003/0052156 A1 | 3/2003 | Kim et al. |
| 2004/0124526 A1 | 7/2004 | Matayabas, Jr. et al. |
| 2005/0228097 A1 | 10/2005 | Zhong |
| 2007/0042533 A1 | 2/2007 | Endo et al. |
| 2007/0117270 A1 | 5/2007 | Renavikar et al. |
| 2007/0131055 A1 | 6/2007 | Cheng et al. |
| 2007/0238282 A1 | 10/2007 | Furman et al. |
| 2008/0023665 A1 | 1/2008 | Weiser et al. |
| 2008/0291634 A1 | 11/2008 | Weiser et al. |
| 2011/0024101 A1 | 2/2011 | Han et al. |
| 2011/0038124 A1 | 2/2011 | Burnham et al. |
| 2014/0264820 A1 | 9/2014 | Hu et al. |
| 2014/0374897 A1 | 12/2014 | Zhao et al. |
| 2015/0101785 A1 | 4/2015 | Ho et al. |
| 2016/0219751 A1 | 7/2016 | Kempers |
| 2017/0179002 A1 | 6/2017 | Chainer et al. |
| 2017/0200667 A1 | 7/2017 | John et al. |
| 2017/0218167 A1 | 8/2017 | Majidi et al. |
| 2017/0249751 A1* | 8/2017 | Indelman ................ G06F 18/24 |
| 2018/0090411 A1 | 3/2018 | Cetegen et al. |
| 2018/0269128 A1 | 9/2018 | Limaye et al. |
| 2018/0323130 A1 | 11/2018 | Liu et al. |
| 2018/0374714 A1 | 12/2018 | Stathakis et al. |
| 2019/0172726 A1 | 6/2019 | Berntson et al. |
| 2019/0181069 A1 | 6/2019 | Rykaczewski et al. |
| 2019/0221495 A1 | 7/2019 | Divakar et al. |
| 2019/0221498 A1 | 7/2019 | Wu et al. |
| 2019/0348345 A1 | 11/2019 | Parida et al. |
| 2020/0168523 A1 | 5/2020 | Huang et al. |
| 2020/0219786 A1 | 7/2020 | Hung et al. |
| 2020/0227338 A1 | 7/2020 | Gong |
| 2020/0227339 A1 | 7/2020 | Schwab et al. |
| 2020/0263285 A1 | 8/2020 | Stowell et al. |
| 2020/0328007 A1 | 10/2020 | Majidi et al. |
| 2020/0362218 A1 | 11/2020 | Kazem et al. |
| 2021/0125896 A1 | 4/2021 | Arrington et al. |
| 2021/0126246 A1 | 4/2021 | Gazda et al. |
| 2021/0233832 A1 | 7/2021 | Uppal et al. |
| 2021/0272873 A1 | 9/2021 | Kazem et al. |
| 2022/0199489 A1 | 6/2022 | Arrington et al. |
| 2022/0380652 A1 | 12/2022 | Maruyama et al. |
| 2023/0034217 A1 | 2/2023 | Mayukh et al. |
| 2024/0199817 A1 | 6/2024 | Yamada et al. |
| 2024/0203754 A1 | 6/2024 | Kazem et al. |
| 2024/0213115 A1 | 6/2024 | Kazem et al. |
| 2024/0243033 A1 | 7/2024 | Kazem et al. |
| 2025/0069987 A1 | 2/2025 | Kazem et al. |
| 2025/0112127 A1* | 4/2025 | Jun .................... H10W 70/417 |
| 2025/0197596 A1 | 6/2025 | Kazem et al. |

FOREIGN PATENT DOCUMENTS

| | | |
|---|---|---|
| CN | 104031600 A | 9/2014 |
| CN | 104031600 B | 3/2016 |
| CN | 103665770 B | 7/2016 |
| CN | 107393627 A | 11/2017 |
| CN | 107452436 A | 12/2017 |
| CN | 107501953 A | 12/2017 |
| CN | 109135685 A | 1/2019 |
| CN | 107393627 B | 11/2019 |
| CN | 110564157 A | 12/2019 |
| EP | 696630 A2 | 2/1996 |
| EP | 696630 A3 | 5/1997 |
| EP | 1300883 A2 | 4/2003 |
| EP | 3872853 A1 | 9/2021 |
| EP | 3923317 A1 | 12/2021 |
| JP | 2003-234586 A | 8/2003 |
| JP | 2008-306202 A | 12/2008 |
| JP | 5565758 B2 | 6/2014 |
| JP | 6042307 B2 | 11/2016 |
| KR | 20190016856 A1 | 2/2019 |
| KR | 102176691 B1 | 11/2020 |
| WO | 02/069685 A1 | 9/2002 |
| WO | 2016/004565 A1 | 1/2016 |
| WO | 2017165608 A1 | 9/2017 |
| WO | 2019/136252 A1 | 7/2019 |
| WO | 2020129555 A1 | 6/2020 |
| WO | 20220204689 A1 | 9/2022 |
| WO | 2023081478 A1 | 5/2023 |
| WO | 2024084897 A1 | 4/2024 |

OTHER PUBLICATIONS

Fassler, Andrew L., Application of Liquid-Metal GaIn Alloys to Soft-matter Capacitance and Related Stretchable Electronics Submitted in partial fulfillment of the requirements for the degree of Doctor of Philosophy in Mechanical Engineering, Carnegie Mellon University, Pittsburgh, PA, Jan. 2016, 154 pages.

Hutter et al., Formation of Spherical and Non-Spherical Eutectic Gallium-Indium Liquid-Metal Microdroplets in Microfluidic Channels at Room Temperature, Advanced Functional Materials, 2012, 8 pages.

Thelen et al., A study of the production and reversible stability of EGaIn liquid metal microspheres using flow focusing, Lab on a Chip, 2012, 12, pp. 3961-3961.

Wang et al., A Highly Stretchable Liquid Metal Polymer as Reversible Transitional Insulator and Conductor, Advanced Materials, vol. 31, No. 23, Apr. 11, 2019, 10 pages.

* cited by examiner

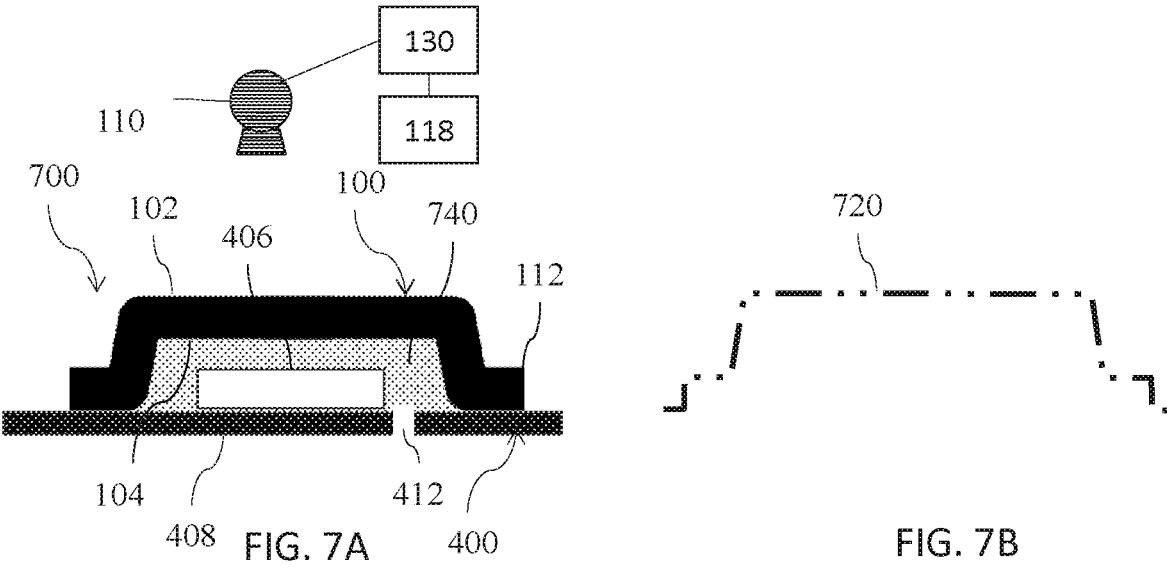
FIG. 7A
FIG. 7B
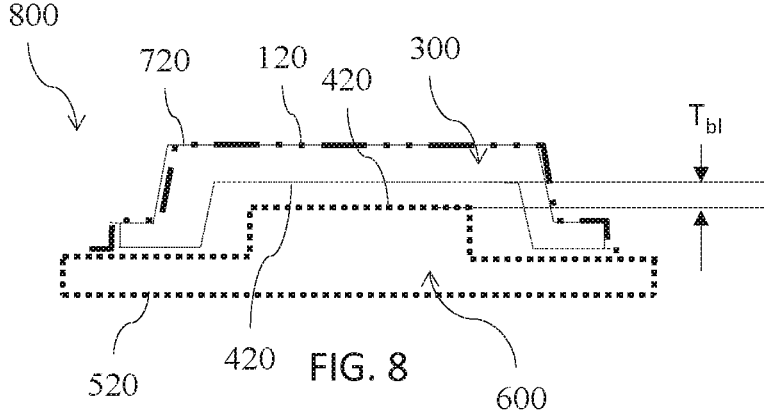
FIG. 8

1100

1200

METHODS AND SYSTEMS FOR GENERATING A BOND LINE PARAMETER OF A CIRCUIT ASSEMBLY, AND METHODS OF MANUFACTURE OF A CIRCUIT ASSEMBLY

CROSS-REFERENCE

This application claims priority to U.S. Provisional Patent Application No. 63/515,938, which was filed on Jul. 27, 2023. The contents of which is hereby incorporated by reference into this specification.

FIELD

The present disclosure relates to methods and systems for generating a bond line parameter of a circuit assembly, and methods of manufacture of a circuit assembly.

BACKGROUND

A thermal interface material (TIM) can be used to thermally connect two or more layers together. For example, TIMs are often used in central processing unit (CPU) packages to thermally connect the integrated heat spreader (IHS) of a CPU package to a heat sink. There are various types of TIMs that can be used and various manufacturing processes that can be used. However, ensuring proper manufacture of the CPU package in a non-destructive manner presents challenges.

SUMMARY

In one general aspect, the present disclosure is directed to a method for generating a bond line parameter of a circuit assembly. In various examples, the bond line parameter can comprise at least one parameter selected from the group consisting of volume, mean average thickness, a standard deviation of a thickness, a thickness map, a maximum thickness, a minimum thickness, an angle of the first component relative to the second component, and an angle of the second component relative to the first component. The method comprises receiving first three-dimensional data of a first component of the circuit assembly and receiving second three-dimensional data of a second component of the circuit assembly. The first three-dimensional data corresponds to a first region and a second region of the first component. The second three-dimensional data corresponds to a first region of the second component. The method comprises capturing, by a sensor, third three-dimensional data of the circuit assembly. The third three-dimensional data corresponds to the first region of the first component and the first region of the second component. In various examples, the sensor can comprise an optical sensor, a laser scanner, a computerized tomography scanner, an atomic force microscopy sensor, and a contact profilometer. In certain examples, the first three-dimensional data, the second three-dimensional data, and the third three-dimensional data can comprise a point cloud, a height map, a triangulated mesh, and/or a parametric model. Data corresponding to the second region of the first component and at least a portion of the first region of the second component are not present in the third three-dimensional data. The bond line parameter of the circuit assembly can be determined based on the first three-dimensional data, second three-dimensional data, and third three-dimensional data. The determination of the bond line parameter comprises aligning the first three-dimensional data with the second three-dimensional data based on the third three-dimensional data, thereby generating alignment data. The determination of the bond line parameter comprises generating a composite model from the first three-dimensional data and the second three-dimensional data based on the alignment data and generating the bond line parameter by evaluating the second region of the first component in the composite model relative to the first region of the second component in the composite model. In various examples, the circuit assembly can be rejected or accepted based on a comparison of the bond line parameter to a predetermined value. In certain examples, a manufacturing process of the circuit assembly can be adjusted based on the bond line parameter (e.g., applied pressure, amount of thermal interface material. In various examples, a manufacturing process of the circuit assembly can be adjusted based on the bond line parameter.

In another general aspect, the present disclosure is directed to a system for generating a bond line parameter of a circuit assembly. The system comprises a computer system and a sensor. The computer system is configured to receive first three-dimensional data of a first component of the circuit assembly and receive second three-dimensional data of a second component of the circuit assembly. The first three-dimensional data corresponds to a first region and a second region of the first component. The second three-dimensional data corresponds to a first region of the second component. The sensor is configured to capture third three-dimensional data of the circuit assembly. The third three-dimensional data corresponds to the first region of the first component and the first region of the second component. Data corresponding to the second region of the first component and at least a portion of the first region of the second component are not present in the third three-dimensional data. The computer system is further configured to determine the bond line parameter of the circuit assembly based on the first three-dimensional data, second three-dimensional data, and third three-dimensional data. The determining comprises the computer system further configured to align the first three-dimensional data with the second three-dimensional data based on the third three-dimensional data, thereby generating alignment data. The determining comprises the computer system further configured to generate a composite model from the first three-dimensional data and the second three-dimensional data based on the alignment data, and generate the bond line parameter by evaluating the second region of the first component in the composite model relative to the first region of the second component in the composite model.

The present invention can provide an efficient measurement of the bond line parameter in a non-destructive manner, measurement of a circuit assembly while heated or subject to a different condition, and/or generate a parameter related to thermal performance of the circuit assembly. These and other benefits realizable from various embodiments of the present invention will be apparent from the description that follows.

BRIEF DESCRIPTION OF THE DRAWINGS

The features and advantages of various examples of the present invention, and the manner of attaining them, will become more apparent, and the examples will be better understood by reference to the following description of examples taken in conjunction with the accompanying drawing, wherein:

FIG. 7A is cross-sectional view of a system including a sensor and a circuit assembly according to the present disclosure;

FIG. 7B is third three-dimensional data corresponding to the circuit assembly of FIG. 7A;

FIG. 8 is an illustration of the first three-dimensional data of FIG. 3 aligned with the second three-dimensional data of FIG. 6 based on the third three-dimensional data of FIG. 7B;

Corresponding reference characters indicate corresponding parts throughout the several views. The exemplifications set out herein illustrate certain examples, in one form, and such exemplifications are not to be construed as limiting the scope of the examples in any manner.

DETAILED DESCRIPTION

Figures 1A, 1B, 2A, 2B, 3:
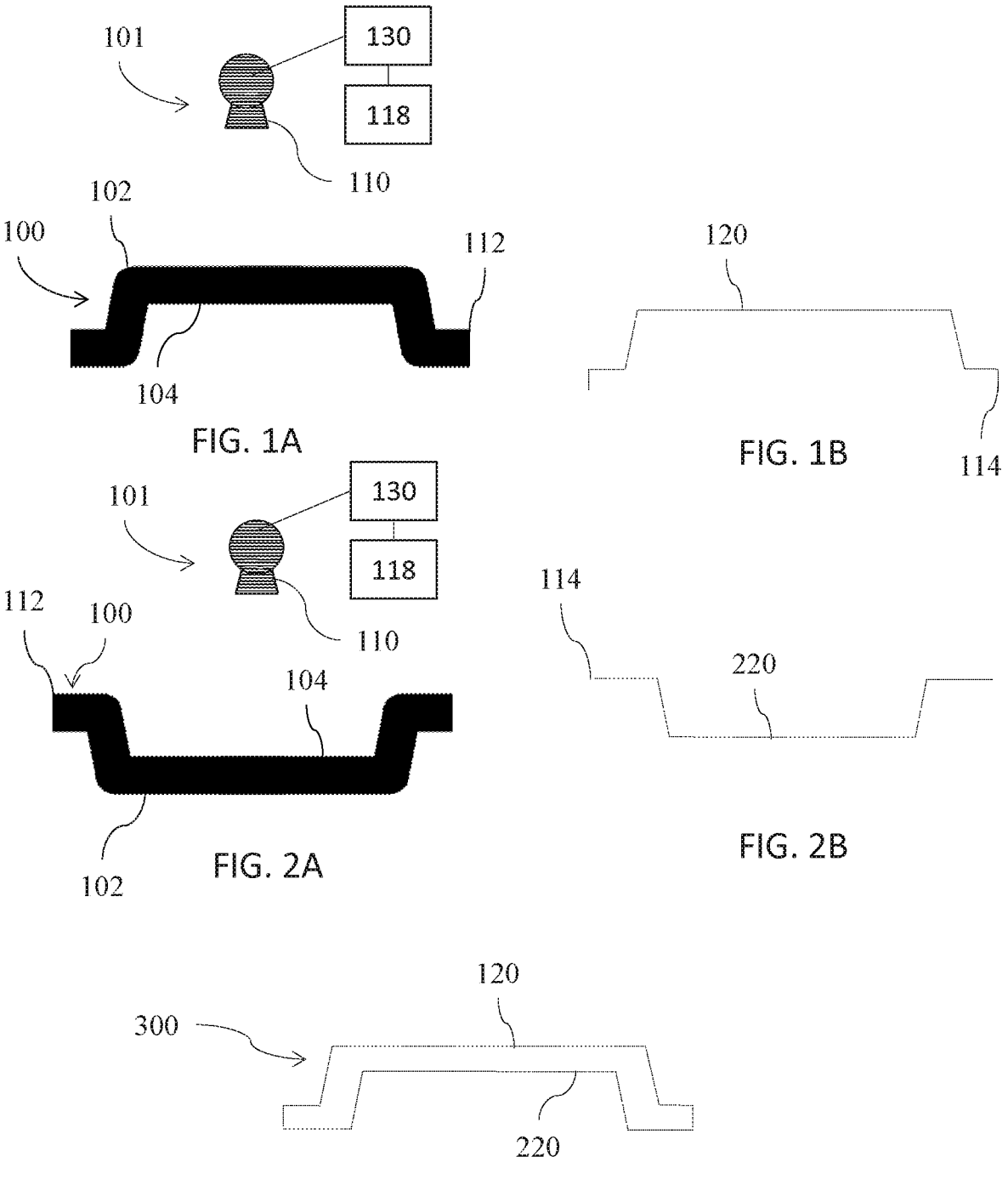
FIG. 1A is a cross-sectional view of a system including a sensor and a first component of a circuit assembly according to the present disclosure.
FIG. 1B is first portion data corresponding to first region of the first component of FIG. 1A.
FIG. 2A is a cross-sectional view of the system of FIG. 1A in a different configuration of the sensor relative to the first component than the configuration shown in FIG. 1A.
FIG. 2B is second portion data corresponding to a second region of the first component of FIG. 2A.
FIG. 3 is first three-dimensional data corresponding to the first region and the second region of the first component of FIG. 1A.

Certain exemplary aspects of the present invention will now be described to provide an overall understanding of the principles of the composition, function, manufacture, and use of the compositions and methods disclosed herein. An example or examples of these aspects are illustrated in the accompanying drawing. Those of ordinary skill in the art will understand that the compositions, articles, and methods specifically described herein and illustrated in the accompanying drawing are non-limiting exemplary aspects and that the scope of the various examples of the present invention is defined solely by the claims. The features illustrated or described in connection with one exemplary aspect may be combined with the features of other aspects.

Such modifications and variations are intended to be included within the scope of the present invention.

A thermal interface material (TIM) can be applied to a circuit assembly between an integrated heat spreader (IHS) and a heat sink to enable thermal transfer therebetween. Determining a bond line parameter of the circuit assembly typically required cutting the circuit assembly after manufacture in order to measure the bond line parameter, which may be on the micron scale (e.g., less than 1000 μm or less than 500 μm).

Thus, the present inventors provide, in various examples, methods and systems for generating a bond line parameter of a circuit assembly, and methods of manufacture of a circuit assembly. The method can comprise receiving first three-dimensional data of a first component of the circuit assembly and receiving second three-dimensional data of a second component of the circuit assembly. The first three-dimensional data corresponds to a first region and a second region of the first component. The second three-dimensional data corresponds to a first region of the second component. The method can comprise capturing, by a sensor, third three-dimensional data of the circuit assembly. The third three-dimensional data corresponds to the first region of the first component and the first region of the second component. Data corresponding to the second region of the first component and at least a portion of the first region of the second component may not be present in the third three-dimensional data. The bond line parameter of the circuit assembly can be determined based on the first three-dimensional data, second three-dimensional data, and third three-dimensional data. The determination of the bond line parameter can comprise aligning the first three-dimensional data with the second three-dimensional data based on the third three-dimensional data, thereby generating alignment data. The determination of the bond line parameter can comprise generating a composite model from the first three-dimensional data and the second three-dimensional data based on the alignment data and generating the bond line parameter by evaluating the second region of the first component in the composite model relative to the first region of the second component in the composite model.

Referring to FIG. 1, a system 101 is provided with a computer system 130 in communication with a sensor 110. The computer system 130 can be in communication with the sensor 110 via any suitable wired or wireless communication link, such as Ethernet cables, RS-232 cables, Bluetooth, etc. The computer system 130 may also be in data communication with a data store 118 (e.g., via a local area network (LAN)). The data store 118 is a repository for storing and managing data and can be implemented with a database (e.g., a relational database, a non-relational database) or other file storage type. The data store 118 can be implemented with in-memory, distributed, federated, and/or cloud-based data stores, for example.

The functionality of the computer system 130 described herein may be implemented with software that is stored in computer memory and executed by a processor(s) of the computer system 130. The software may use any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

The processor or processors of the computer system 130 may comprise onboard memory (ROM or RAM) and off-board memory. The onboard memory may comprise primary, volatile, and/or non-volatile storage (e.g., storage directly accessible by the processor cores). The offboard memory may comprise secondary, non-volatile storage (e.g., storage that is not directly accessible by the processor cores), such as ROM, hard disk drives, solid-state drives, flash, etc. The processor cores may be CPU cores and/or graphics processing unit (GPU) cores, for example. The software that is executed by the processor or processors to perform the described functions of the computer system 130 herein may be stored in the offboard and/or onboard memory described above.

The method for generating a bond line parameter of a circuit assembly is provided herein with reference to FIGS. 1A-1B, 2A-2B, 3, 4A-4B, 5A-5B, 6, 7A-7B, and 8, but the method is not limited to only a circuit assembly and could be applied to other devices. For example, first three-dimensional data 300 illustrated in FIG. 3 of the first component 100 of the circuit assembly 700 illustrated in FIG. 7A can be received by the computer system 130. The first three-dimensional data 300 corresponds to a first region 102 and a second region 104 of the first component 100. Second three-dimensional data 600 illustrated in FIG. 6 of the second component 400 of the circuit assembly 700 illustrated in FIG. 7A can be received by the computer system 130. The second three-dimensional data 600 corresponds to a first region 402 and a second region 404 of the second component 400.

The first component 100 and/or second component 400, individually, can be at least one of a battery, a processor, a heat sink (e.g., fins, fan, liquid cooling, cold plate, heat sink, heat wick, heat pipe), an integrated heat spreader, and packaging. In various examples, the second component 400 can be a heat-generating electronic component (e.g., a battery, memory, a data storage unit, a power inverter, a thermoelectric generator, a motor winding, an integrated circuit) and/or thermally connected to the heat-generating electronic component. The integrated circuit can comprise a processor (e.g., CPU, tensor processing unit, GPU, artificial intelligence focused processor, an ASIC, and/or a system-on-a-chip). For example, the first component 100 can comprise a heat sink, an integrated heat spreader, and/or packaging and the second component 400 can comprise a heat-generating electronic component.

In various examples, the first three-dimensional data 300 of the first component 100 and/or the second three-dimensional data 600 of the second component 400 can be captured by the sensor 110 prior to combining the first component 100 and the second component 400 to form the circuit assembly 700. The sensor 110 is configured to capture three-dimensional data of an object. For example, the sensor 110 can comprise an optical sensor (e.g., a camera (e.g., CCD, CMOS, hyperspectral, time of flight), white-light interferometer, confocal microscope, an infrared sensor, a spectrometer), laser scanner, a computerized tomography (CT) scanner, an atomic force microscopy (AFM) sensor, a contact profilometer, and/or other three-dimensional point mapping device. For example, the sensor 110 may comprise an optical sensor. In certain examples, the optical sensor can utilize projection moiré, shadow moiré, a photogrammetry technique, or a combination thereof.

The first three-dimensional data 300 illustrated in FIG. 3 can be generated and received by the computer system 130 by capturing with the sensor 110 first portion data 120 as illustrated in FIG. 1B corresponding to the first region 102 of the first component 100 and second portion data 220 illustrated in FIG. 2B corresponding to the second region 104 of the first component 100. In various examples, the first portion data 120 is captured by the sensor 110 at a first pose (e.g., position, orientation) of the sensor 110 relative to the first component 100 as illustrated in FIG. 1A and the second portion data 220 is captured by the sensor 110 at a second pose of the sensor 110 relative to the first component 100 as illustrated in FIG. 2A. The first pose illustrated in FIG. 1A and the second pose illustrated in FIG. 2A are different. The first portion data 120 and the second portion data 220 may be stored in data store 118.

A first feature data 114 based on a first feature 112 present in the first region 102 and the second region 104 can be determined by the computer system 130. The first feature 112 can comprise at least one of an edge, a corner, a face, a bore, a maximum surface dimension, a minimum surface dimension, a marker (e.g., a different color, a surface roughness, a change in chemistry), a bump, a gridline, a depression, a recess, an engraving, a divot, or other feature. As illustrated in FIG. 1A, the first feature 112 comprises an edge. The first portion data 120 illustrated in FIG. 1B and the second portion data 220 illustrated in FIG. 2B can be aligned based on the first feature data 114, thereby generating first component alignment data. The first component alignment data can comprise a machine executable instruction to scale, rotate, invert, transform, composite, and/or translate the first portion data 120 and/or the second portion data 220 based on the first feature data 114 (e.g., using the first feature data 114 as a reference) to form the first three-dimensional data 300 illustrated in FIG. 3.

Referring to FIG. 3, the first three-dimensional data 300 can be generated from the first portion data 120 and the second portion data 220 based on the first component alignment data. For example, as illustrated in FIG. 3 and relative to the orientation of the drawings, the second portion data 220 has been rotated 180 degrees and the first feature data 114 in the first portion data 120 and the second portion data 220 have been made adjacent to form data corresponding to the first component 100. In various examples, the first three-dimensional data 300 can be generated from other portion data (not shown), in addition to the first portion data 120 and the second portion data 220. The first three-dimensional data 300 may be stored in data store 118. In various examples, the first three-dimensional data 300 may have been previously stored in data store 118 and/or captured by a different system.

Figures 4A, 4B, 5A, 5B, 6:
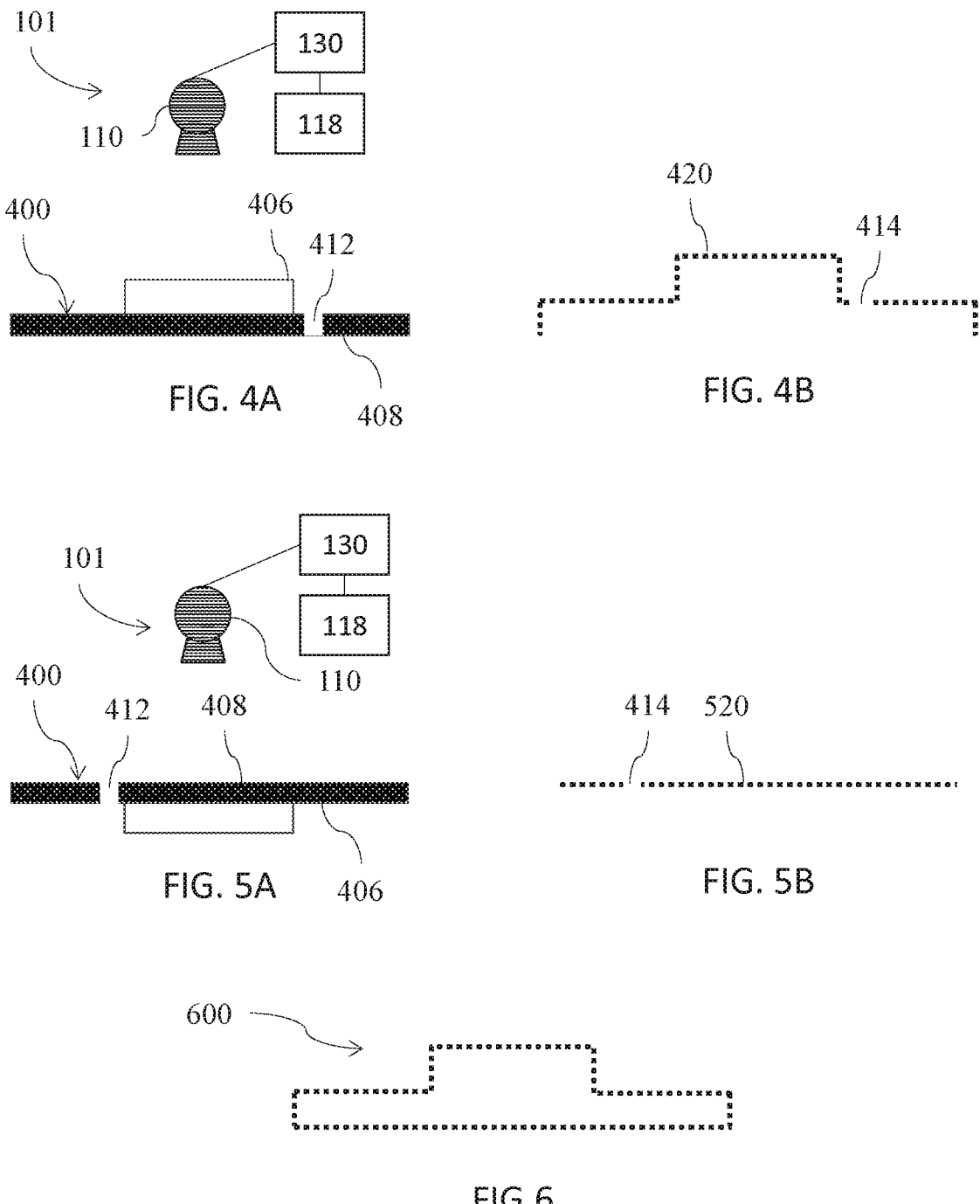
FIG. 4A is cross-sectional view of a system including a sensor and a second component of a circuit assembly according to the present disclosure.
FIG. 4B is third portion data corresponding to first region of the second component of FIG. 4A.
FIG. 5A is a cross-sectional view of the system of FIG. 4A in a different configuration of the sensor relative to the first component than the configuration shown in FIG. 4A.
FIG. 5B is second portion data corresponding to a second region of the first component of FIG. 5A.
FIG. 6 is second three-dimensional data corresponding to the first region and the second region of the second component of FIG. 4A.

The second three-dimensional data 600 illustrated in FIG. 6 can be generated and received by the computer system 130 by capturing with the sensor 110 third portion data 420 illustrated in FIG. 4B corresponding to the first region 406 of the second component 400 and fourth portion data 520 illustrated in FIG. 5B corresponding to the second region 408 of the second component 400. In various examples, the third portion data 420 is captured by the sensor 110 at a first pose of the sensor 110 relative to the second component 400 as illustrated in FIG. 4A and the fourth portion data 520 is captured at a second pose of the sensor 110 relative to the second component 400 as illustrated in FIG. 5A. The first pose illustrated in FIG. 4A and the second pose illustrated in FIG. 5A are different. The third portion data 420 and the fourth portion data 520 may be stored in data store.

Second feature data 414 based on a second feature 412 present in the first region 406 and the second region 408 can be determined by the computer system 130. The second feature 412 can comprise at least one of an edge, a corner, a face, a bore, a maximum surface dimension, a minimum surface dimension, a marker (e.g., a different color, a surface roughness (smooth, rough, etc.), a change in chemistry), a bump, a gridline, a depression, a recess, an engraving, a divot, or other feature. As illustrated in FIG. 4A, the second feature 412 comprises a bore. The third portion data 420 illustrated in FIG. 4B and the fourth portion data 520 illustrated in FIG. 5B can be aligned based on the second feature data 414, thereby generating the second component alignment data. The second component alignment can comprise a machine executable instruction to scale, rotate, invert, transform, composite, and/or translate the third portion data 420 and/or the fourth portion data 520 based on the second feature data 414 (e.g., using the first feature data 114 as a reference) to form the second three-dimensional data 600.

Referring to FIG. 6, the second three-dimensional data 600 can be generated by the computer system 130 from the third portion data 420 illustrated in FIG. 4B and the fourth portion data 520 illustrated in FIG. 5B based on the second component alignment data. For example, as illustrated in FIG. 6 and relative to the orientation of the drawings, the fourth portion data 420 has been rotated 180 degrees and the second feature data 414 in the third portion data 420 and the fourth portion data 520 have been made adjacent. The second three-dimensional data 600 may be stored in data store 118. In various examples, the second three-dimensional data 600 may have been previously stored in data store 118 and/or captured by a different system.

Referring to FIG. 7A, the first component 100 and the second component 400 can be combined to form the circuit assembly 700. For example, a TIM 740 can be applied to the second region 104 of the first component 100 and/or the first region 406 of the second component 400 prior to combining the first component 100 and the second component 400 to form the circuit assembly 700. The first component 100 and the second component 400 can be compressed together and the TIM 740 can be cured. In certain examples, a sealant (not shown in FIG. 7A) can be applied to the second region 104 of the first component 100 and/or the first region 406 of the second component 400 prior to combining the first component 100 and the second component 400 to form the circuit assembly 700.

The TIM can be comprise an emulsion of polymer and liquid metal droplets. Exemplary TIMs for use with the present disclosure are described in (1) U.S. Pat. No. 10,777, 483; (2) U.S. Pat. No. 11,335,622; (3) International Publication No. WO/2019/136252; (4) International Publication No. WO 2022/204689; (5) U.S. Patent Publication No. 2017/0218167; (6) U.S. Patent Publication No. 2017/0218167; (7) U.S. Provisional Patent No. 63/268,134; (8) U.S. Provisional Patent Application No. 63/479,879; (9) U.S. Provisional Patent Application No. 63/165,810; (10) U.S. Provisional Patent Application No. 63/452,136; (11) U.S. Provisional Patent Application No. 63/482,449; and (12) U.S. Provisional Patent Application No. 63/489,016. The contents of each are incorporated herein by reference in their entirety.

Figure 9:
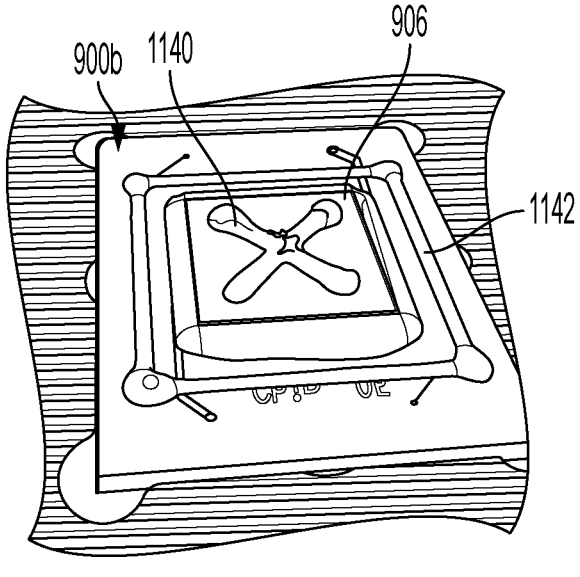
FIG. 9 is a first component of a circuit assembly with a thermal interface material and a sealant applied to a first region thereof according to the present disclosure.
Figure 10:
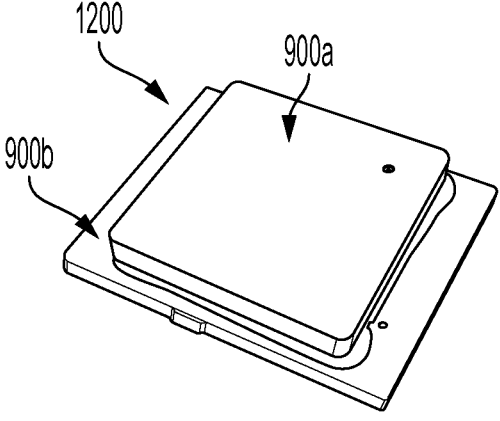
FIG. 10 is a circuit assembly manufactured with the first component of FIG. 9.

In various examples, referring to FIG. 9, a TIM 940 can be applied to a first region 906 of the second component 900*b* and a sealant 942 can be applied to a different portion of the first region 906 of the second component 900*b*. Thereafter, referring to FIG. 10, a first component 900*a* and the second component 900*b* can be compressed together and the TIM 740 and sealant 942 can be cured to form the circuit assembly 1000.

Referring again to FIGS. 7A-7B, after formation of the circuit assembly 700, third three-dimensional data 720 of the circuit assembly 700 can be captured by the sensor 110 and received by the computer system 130 and optionally stored in data store 118. The third three-dimensional data 720 can correspond to at least a portion of the first region 102 of the first component 100 and the first region 406 of the second component 400. In certain examples, data corresponding to the second region 104 of the first component 100 and the second region 408 of the second component 400 are not present in the third three-dimensional data 720. In various examples, the third three-dimensional data 720 may comprise data corresponding to less than all of the first region 406 of the second component 400 (e.g., third three-dimensional data may not comprise data corresponding to at least a portion of the first region 406 of the second component 400).

Referring to FIG. 8, a bond line parameter of the circuit assembly 700 can be determined by the computer system 130 based on the first three-dimensional data 300, second three-dimensional data 600, and third three-dimensional data 720 and can be stored in data store 118. For example, the first three-dimensional data 300 can be aligned with the second three-dimensional data 600 based on the third three-dimensional data 720, thereby generating assembly alignment data. The assembly alignment data can comprise a machine executable instruction to scale, rotate, invert, transform, composite, and/or translate the first three-dimensional data 300 and/or the second three-dimensional data 600 based on the third three-dimensional data 720 to form the composite model 800 illustrated in FIG. 8.

In various examples, the first component alignment data, the second component alignment data, and/or assembly alignment data can comprise a rotation matrix and/or translation vector; common reference planes and/or points; detected edges; and other alignment instructions.

In various examples, the first three-dimensional data 300, the second three-dimensional data 600, the third three-dimensional data 720, and/or the composite model 800 can be further post processed. For example, a technique of filtering and/or smoothing can be applied to the first three-dimensional data 300, the second three-dimensional data 600, the third three-dimensional data 720, and/or the composite model 800.

The composite model 800 can be generated from the first three-dimensional data 300 and the second three-dimensional data 600 based on the assembly alignment data. The bond line parameter can be generated by evaluating data corresponding to the second region 104 of the first component 100 in the composite model 800 relative to data corresponding to the first region 406 of the second component 400 in the composite model 800. In various examples, the first three-dimensional data 300 and the second three-dimensional data are generated from the components, 100 and 400, used to make the circuit assembly 700 the third three-dimensional data 720 was generated from, thereby enhancing the accuracy of the bond line parameter to the actual measurement in the circuit assembly 700.

Figure 11:
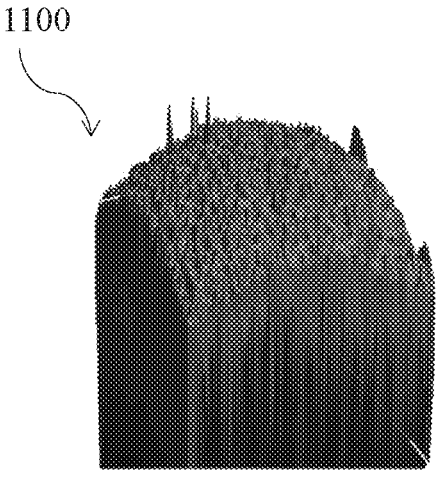
FIG. 11 is a height map of the first component of FIG. 9 prior to application of the thermal interface material and sealant.

Various forms of three-dimensional data may be used herein. For example, the first three-dimensional data 300, the second three-dimensional data 600, the third three-dimensional data 720, and/or the composite model 800 can comprise a point cloud, a height map, a triangulated mesh, and/or a parametric model. For example, the first three-dimensional data 300, the second three-dimensional data 600, and the third three-dimensional data 720 can comprise a height map and optionally, the composite model 800 may comprise a difference in heights between the first three-dimensional data 300 and the second three-dimensional data 600 based on their position relative to one another based on the third three-dimensional data 720. For example, the first three-dimensional data 300 can comprise a height map 1100 as illustrated in FIG. 11.

The bond line parameter can comprise a volume, mean average thickness, a standard deviation of a thickness, a thickness map, a maximum thickness, and/or a minimum thickness, of the TIM 740 and 940, the sealant 942, and/or other component intermediate the first component 100 and second component 400, and/or an angle of the first component 100 relative to the second component 400 or vice versa. In various examples, the bond line parameter is a bond line thickness, TBL, of the TIM 740 and 940.

The bond line parameter can be generated by the computer system 130 in various manners. For example, the bond line parameter can be generated by adding, combining, and/or integrating specific regions within the composite model 800. In certain examples, determining the bond line parameter comprises determining a distance between the first three-dimensional data 300 and the second three-dimensional data 600 in the composite model 800. In various examples, generating the bond line parameter can comprises subtracting the first three-dimensional data 300 and the second three-dimensional data 600 from the third three-dimensional data 720. In certain examples, determining the bond line parameter comprises determining the relative orientations of regions within the composite model 800 and/or calculating the relative orientations between regions within the composite model 800 and regions of the first three-dimensional data 300 and/or second three-dimensional data 600. In various examples, the method and systems described herein may be desirable for applications where the bond line parameter is on the micron scale (e.g., less than 1000 μm or less than 500 μm) and/or where a non-destructive measurement is desired.

The bond line parameter can be compared to a predetermined value by the computer system 130 and the circuit assembly 700 can be rejected or accepted based on the comparison automatically and dynamically. In various examples where the bond line parameter comprises an average, minimum, and/or maximum thickness of the TIM 740, the predetermined value may be selected such that a desirable thermal resistance or thermal conductivity of the circuit assembly 700 is achieved, thereby ensuring the circuit assembly 700 can operate at desirable temperatures, stresses and/or durations. In various examples where the bond line parameter comprises an average, minimum, and/or maximum thickness of the TIM 740, the circuit assembly 700 can be further compressed based on a comparison of the bond line parameter to the predetermined value being undesirable (e.g., a bond line thickness, TBL, is greater than the predetermined value). In certain examples, a maximum operable temperature for the circuit assembly 700 can be set based on the bond line parameter and the circuit assembly can be operated at temperatures up to the maximum operable temperate.

In various examples, the bond line parameter can be used by the computer system 130 as feedback for the manufacturing process of the circuit assembly 700. For examples, the bond line parameter can be used to adjust at least one manufacturing parameter, such as, for example, a pressure applied to the first component 100 and the second component 400, an amount of TIM 740 and 940 dispensed, a surface area coverage of TIM 740, a location of TIM 740 on the first component 100 and/or second component 400, an amount of sealant 942 dispensed, a surface area coverage of sealant 942, a location of sealant 942 on the first component 100 and/or second component 400, a curing temperature of the TIM 740 and 940 and/or sealant 942, a curing time of the TIM 740 and 940 and/or sealant 942. Thus, the manufacturing process of the circuit assembly 700 can be automatically and dynamically adjusted.

In certain examples, the bond line parameter can be used by the computer system 130 to: determine the thermal resistance and/or thermal conductivity through the TIM 740; determine, with the composite model 800, the surface interfacial stresses at the interface between the TIM 740 and 940 and sealant 942, and the first component 100 and/or second component 400; determine a strain that would be experienced by the TIM 740 under subsequent pressure; determine operable stresses and/or temperature ranges for the circuit assembly 700; determine surface area coverage by the TIM 740 and 940 and/or sealant 942; determine spill-out volume of the TIM 740 and 940 and/or sealant 942; determine a flow velocity of the TIM 740 and 940 and/or sealant 942 during compression; and/or determine a stress experienced by the TIM 740 and 940 and/or sealant 942 as a result of the compression.

Figure 12:
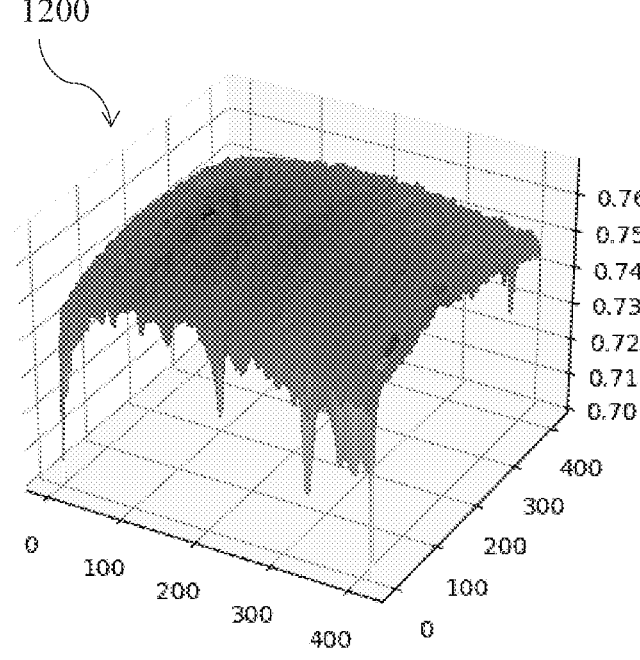
FIG. 12 is three-dimensional data generated from bond line parameters of the circuit assembly of FIG. 10 according to the present disclosure.

Referring to FIG. 12, bond line parameters can be used to generate three-dimensional data 1200 that comprises data corresponding to the TIM 940.

As used in this specification, the terms "cure" and "curing" refer to the chemical cross-linking of components in an emulsion or material applied over a substrate or the increase of viscosity of the components in the emulsion or material applied over the substrate. Accordingly, the terms "cure" and "curing" do not encompass solely physical drying of an emulsion or material through solvent or carrier evaporation. In this regard, the term "cured," as used in this specification in examples comprising a thermosetting polymer, refers to the condition of an emulsion or material in which a component of the emulsion or material has chemically reacted to form new covalent bonds in the emulsion or material (e.g., new covalent bonds formed between a binder resin and a curing agent). The term "cured", as used in this specification in examples comprising a thermoplastic polymer, refers to the condition of an emulsion or material in which the temperature of the thermoplastic polymer decreases below the melting point of the thermoplastic polymer such that the viscosity of the emulsion or material increases. In examples comprises both a thermosetting polymer and a thermoplastic polymer, the term "cured" refers to one of or both of the polymers curing as described herein.

Those skilled in the art will recognize that the herein described compositions, articles, methods, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the appended claims, those skilled in the art will appreciate that recited operations therein may generally be performed in any order. Also, although various operational flows are presented in a sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various examples have been described herein, many modifications, variations, substitutions, changes, and equivalents to those examples may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed examples. The following claims are intended to cover all such modification and variations.

Various aspects of the invention according to the present disclosure include, but are not limited to, the aspects listed in the following numbered clauses.

Clause 1. A method for generating a bond line parameter of a circuit assembly, the method comprising: receiving first three-dimensional data of a first component of the circuit assembly, the first three-dimensional data corresponding to a first region and a second region of the first component; receiving second three-dimensional data of a second component of the circuit assembly, the second three-dimensional data corresponding to a first region of the second component; capturing, by a sensor, third three-dimensional data of the circuit assembly, the third three-dimensional data corresponding to the first region of the first component and the first region of the second component, wherein data corresponding to the second region of the first component and at least a portion of the first region of the second component are not present in the third three-dimensional data; and determining the bond line parameter of the circuit assembly based on the first three-dimensional data, second three-dimensional data, and third three-dimensional data, the determining comprising: aligning the first three-dimensional data with the second three-dimensional data based on the third three-dimensional data, thereby generating alignment data; generating a composite model from the first three-dimensional data and the second three-dimensional data based on the alignment data; and generating the bond line parameter by evaluating the second region of the first component in the composite model relative to the first region of the second component in the composite model.

Clause 2. The method of clause 1 further comprising: capturing, by the sensor, the first three-dimensional data of the first component and capturing the second three-dimensional data of the second component prior to combining the first component and the second component to form the circuit assembly; and combining the first component and the second component to form the circuit assembly.

Clause 3. The method of clause 2, further comprising applying a thermal interface material to the second region of the first component and/or the first region of the second component prior to combining the first component and the second component to form the circuit assembly.

Clause 4. The method of clause 3, further comprising: compressing the first component and the second component; and curing the thermal interface material.

Clause 5. The method of any of clauses 1-4, wherein capturing the first three-dimensional data of the first component comprises: capturing, by the sensor, first portion data corresponding to the first region of the first component; capturing, by the sensor, second portion data comprising data corresponding to the second region of the first component; determining a first feature present in the first region and the second region; aligning the first portion data and the second portion data based on the first feature, thereby generating second alignment data; and generating the first three-dimensional data from the first portion data and the second portion data based on the second alignment data.

Clause 6. The method of clause 5, wherein the sensor is selected from the group consisting of an optical sensor, a laser scanner, a computerized tomography scanner, an atomic force microscopy sensor, and a contact profilometer.

Clause 7. The method of any of clauses 5-6, wherein the first portion data is captured at a first pose of the sensor relative to the first component and the second portion is captured at a second pose of the sensor relative to the first component, wherein the first pose and the second pose are different.

Clause 8. The method of any of clauses 5-7, wherein the sensor is an optical sensor.

Clause 9. The method of clause 8, wherein the optical sensor utilizes projection moiré, shadow moiré, or a combination thereof.

Clause 10. The method of any of clauses 5-9, wherein the first feature comprises at least one of an edge, a corner, a face, a bore, a maximum surface dimension, a minimum surface dimension, a marker, a bump, a gridline, a depression, a recess, an engraving, and a divot.

Clause 11. The method of any of clauses 1-10, wherein aligning the first three-dimensional data with the second three-dimensional data comprising at least one of scaling, rotating, inverting, transforming, compositing, and translating the first three-dimensional data and/or the second three-dimensional data based on the third three-dimensional data to form the composite model.

Clause 12. The method of any of clauses 1-11, wherein the first three-dimensional data, the second three-dimensional data, and the third three-dimensional data comprise at least one data type selected from the group consisting of a point cloud, a height map, a triangulated mesh, and a parametric model.

Clause 13. The method of any of clauses 1-12, wherein the first three-dimensional data, the second three-dimensional data, and the third three-dimensional data comprise a height map.

Clause 14. The method of any of clauses 1-13, wherein the bond line parameter comprises at least one parameter selected from the group consisting of volume, mean average thickness, a standard deviation of a thickness, a thickness map, a maximum thickness, a minimum thickness, an angle of the first component relative to the second component, and an angle of the second component relative to the first component.

Clause 15. The method of any of clauses 1-14, wherein determining the bond line parameter comprises determining a distance between the first three-dimensional data and the second three-dimensional data in the composite model.

Clause 16. The method of clause 15, wherein determining the bond line parameter comprises subtracting the first three-dimensional data and the second three-dimensional data from the third three-dimensional data.

Clause 17. The method of any of clauses 1-16, further comprising utilizing the bond line parameter to perform at least one of the following: determine at least one of a thermal resistance and thermal conductivity of the thermal interface material; determine, with the composite model, surface interfacial stresses at the interface between the thermal interface material and at least one of the first component and the second component; determine a strain that would be experienced by the thermal interface material under subsequent pressure; determine an operable stress range for the circuit assembly; determine an operable temperature range for the circuit assembly; determine a surface area coverage by the thermal interface material; determine spill-out volume of the thermal interface material; determine a flow velocity of the thermal interface material during compression; and determine a stress experienced by the thermal interface material as a result of the compression.

Clause 18. The method of any of clauses 1-17, further comprising applying a technique selected from the group consisting of filtering and smoothing to the first three-dimensional data, the second three-dimensional data, the third three-dimensional data, or a combination thereof.

Clause 19. The method of any of clauses 1-18, wherein the first component comprises at least one of a heat sink, an integrated heat spreader, and packaging, and the second component comprises a heat-generating electronic component.

Clause 20. The method of any of clauses 1-19, further comprising comparing the bond line parameter to a predetermined value and rejecting or accepting the circuit assembly based on the comparison.

Clause 21. The method of any of clauses 1-20, further comprises adjusting a manufacturing process of the circuit assembly based on the bond line parameter.

Clause 22. A system for generating a bond line parameter of a circuit assembly, the system comprising: a computer system configured to: receive first three-dimensional data of a first component of the circuit assembly, the first three-dimensional data corresponding to a first region and a second region of the first component; receive second three-dimensional data of a second component of the circuit assembly, the second three-dimensional data corresponding to a first region of the second component; a sensor configured to capture third three-dimensional data of the circuit assembly, the third three-dimensional data corresponding to the first region of the first component and the first region of the second component, wherein data corresponding to the second region of the first component and at least a portion of the first region of the second component are not present in the third three-dimensional data; and wherein the computer system is further configured to determine the bond line parameter of the circuit assembly based on the first three-dimensional data, second three-dimensional data, and third three-dimensional data, the determination by the computer system further configured to: align the first three-dimensional data with the second three-dimensional data based on the third three-dimensional data, thereby generating alignment data; generate a composite model from the first three-dimensional data and the second three-dimensional data based on the alignment data; and generate the bond line parameter by evaluating the second region of the first component in the composite model relative to the first region of the second component in the composite model.

As used herein, "at least one of" a list of elements means one of the elements or any combination of two or more of the listed elements. As an example "at least of A, B, and C" means A only; B only; C only; A and B; A and C; B and C; or A, B, and C.

Various features and characteristics are described in this specification to provide an understanding of the composition, structure, production, function, and/or operation of the invention, which includes the disclosed compositions, coatings, and methods. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

Any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with the written description, sufficiency of description, and added matter requirements.

Also, unless expressly specified or otherwise required by context, all numerical parameters described in this specification (such as those expressing values, ranges, amounts, percentages, and the like) may be read as if prefaced by the word "about," even if the word "about" does not expressly appear before a number. Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameters.

Notwithstanding that numerical ranges and parameters setting forth the broad scope of the invention are approximations, numerical values set forth in the specific examples are reported precisely as possible. Any numerical value, however, inherently contains certain errors necessarily resulting from the standard variation found in its respective testing measurements.

Reference throughout the specification to "various examples," "some examples," "one example," "an example," or the like means that a particular feature, structure, or characteristic described in connection with the example is included in an example. Thus, appearances of the phrases "in various examples," "in some examples," "in one example," "in an example," or the like, in places throughout the specification are not necessarily all referring to the same example. Furthermore, the particular features, structures, or characteristics may be combined in any suitable manner in an example or examples. Thus, the particular features, structures, or characteristics illustrated or described in connection with one example may be combined, in whole or in part, with the features, structures, or characteristics of another example or other examples without limitation. Such modifications and variations are intended to be included within the scope of the present examples.

Any patent, publication, or other document identified in this specification is incorporated by reference into this specification in its entirety unless otherwise indicated but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with the written description, sufficiency of description, and added matter requirements.

Whereas particular examples of this invention have been described above for purposes of illustration, it will be evident to those skilled in the art that numerous variations of the details of the present invention may be made without departing from the invention as defined in the appended claims.

While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

It is understood that the inventions described in this specification are not limited to the examples summarized in the Summary or Detailed Description. Various other aspects are described and exemplified herein.

What is claimed is:
1. A method for generating a bond line parameter of a circuit assembly, the method comprising:

16 receiving first three-dimensional data of a first component of the circuit assembly, the first three-dimensional data corresponding to a first region and a second region of the first component;

receiving second three-dimensional data of a second component of the circuit assembly, the second three-dimensional data corresponding to a first region of the second component;

capturing, by a sensor, third three-dimensional data of the circuit assembly, the third three-dimensional data corresponding to the first region of the first component and the first region of the second component, wherein data corresponding to the second region of the first component and at least a portion of the first region of the second component are not present in the third three-dimensional data; and determining the bond line parameter of the circuit assembly based on the first three-dimensional data, second three-dimensional data, and third three-dimensional data, the determining comprising:

aligning the first three-dimensional data with the second three-dimensional data based on the third three-dimensional data, thereby generating alignment data;

generating a composite model from the first three-dimensional data and the second three-dimensional data based on the alignment data; and generating the bond line parameter by evaluating the second region of the first component in the composite model relative to the first region of the second component in the composite model.

2. The method of claim 1 further comprising:
capturing, by the sensor, the first three-dimensional data of the first component and capturing the second three-dimensional data of the second component prior to combining the first component and the second component to form the circuit assembly; and
combining the first component and the second component to form the circuit assembly.

3. The method of claim 2, further comprising applying a thermal interface material to the second region of the first component and/or the first region of the second component prior to combining the first component and the second component to form the circuit assembly.

4. The method of claim 3, further comprising:
compressing the first component and the second component; and
curing the thermal interface material.

5. The method of claim 1, wherein capturing the first three-dimensional data of the first component comprises:
capturing, by the sensor, first portion data corresponding to the first region of the first component;
capturing, by the sensor, second portion data comprising data corresponding to the second region of the first component;
determining a first feature present in the first region and the second region;
aligning the first portion data and the second portion data based on the first feature, thereby generating second alignment data; and
generating the first three-dimensional data from the first portion data and the second portion data based on the second alignment data.

6. The method of claim 5, wherein the sensor is selected from the group consisting of an optical sensor, a laser scanner, a computerized tomography scanner, an atomic force microscopy sensor, and a contact profilometer.

7. The method of claim 5, wherein the first portion data is captured at a first pose of the sensor relative to the first component and the second portion is captured at a second pose of the sensor relative to the first component, wherein the first pose and the second pose are different.

8. The method of claim 5, wherein the sensor is an optical sensor.

9. The method of claim 8, wherein the optical sensor utilizes projection moiré, shadow moiré, or a combination thereof.

10. The method of claim 5, wherein the first feature comprises at least one of an edge, a corner, a face, a bore, a maximum surface dimension, a minimum surface dimension, a marker, a bump, a gridline, a depression, a recess, an engraving, and a divot.

11. The method of claim 1, wherein aligning the first three-dimensional data with the second three-dimensional data comprising at least one of scaling, rotating, inverting, transforming, compositing, and translating the first three-dimensional data and/or the second three-dimensional data based on the third three-dimensional data to form the composite model.

12. The method of claim 1, wherein the first three-dimensional data, the second three-dimensional data, and the third three-dimensional data comprise at least one data type selected from the group consisting of a point cloud, a height map, a triangulated mesh, and a parametric model.

13. The method of claim 1, wherein the first three-dimensional data, the second three-dimensional data, and the third three-dimensional data comprise a height map.

14. The method of claim 1, wherein the bond line parameter comprises at least one parameter selected from the group consisting of volume, mean average thickness, a standard deviation of a thickness, a thickness map, a maximum thickness, a minimum thickness, an angle of the first component relative to the second component, and an angle of the second component relative to the first component.

15. The method of claim 1, wherein determining the bond line parameter comprises determining a distance between the first three-dimensional data and the second three-dimensional data in the composite model.

16. The method of claim 15, wherein determining the bond line parameter comprises subtracting the first three-dimensional data and the second three-dimensional data from the third three-dimensional data.

17. The method of claim 1, further comprising utilizing the bond line parameter to perform at least one of the following:

determine at least one of a thermal resistance and thermal conductivity of the thermal interface material;

determine, with the composite model, surface interfacial stresses at the interface between the thermal interface material and at least one of the first component and the second component;

determine a strain that would be experienced by the thermal interface material under subsequent pressure;

determine an operable stress range for the circuit assembly;

determine an operable temperature range for the circuit assembly;

determine a surface area coverage by the thermal interface material;

determine spill-out volume of the thermal interface material;

determine a flow velocity of the thermal interface material during compression; and determine a stress experienced by the thermal interface material as a result of the compression.

18. The method of claim 1, further comprising applying a technique selected from the group consisting of filtering and smoothing to the first three-dimensional data, the second three-dimensional data, the third three-dimensional data, or a combination thereof.

19. The method of claim 1, wherein the first component comprises at least one of a heat sink, an integrated heat spreader, and packaging, and the second component comprises a heat-generating electronic component.

20. The method of claim 1, further comprising comparing the bond line parameter to a predetermined value and rejecting or accepting the circuit assembly based on the comparison.

21. The method of claim 1, further comprises adjusting a manufacturing process of the circuit assembly based on the bond line parameter.

22. A system for generating a bond line parameter of a circuit assembly, the system comprising:

a computer system configured to:

receive first three-dimensional data of a first component of the circuit assembly, the first three-dimensional data corresponding to a first region and a second region of the first component;

receive second three-dimensional data of a second component of the circuit assembly, the second three-dimensional data corresponding to a first region of the second component;

a sensor configured to capture third three-dimensional data of the circuit assembly, the third three-dimensional data corresponding to the first region of the first component and the first region of the second component, wherein data corresponding to the second region of the first component and at least a portion of the first region of the second component are not present in the third three-dimensional data; and wherein the computer system is further configured to determine the bond line parameter of the circuit assembly based on the first three-dimensional data, second three-dimensional data, and third three-dimensional data, the determination by the computer system further configured to:

align the first three-dimensional data with the second three-dimensional data based on the third three-dimensional data, thereby generating alignment data;

generate a composite model from the first three-dimensional data and the second three-dimensional data based on the alignment data; and generate the bond line parameter by evaluating the second region of the first component in the composite model relative to the first region of the second component in the composite model.

* * * * *